US006915581B2

(12) United States Patent
Harris

(10) Patent No.: US 6,915,581 B2
(45) Date of Patent: *Jul. 12, 2005

(54) SAW GUIDE FOR USE WITH LINED SHEET MATERIAL

(76) Inventor: David N. Harris, 15274 Camino del Parque, Sonora, CA (US) 95370

( * ) Notice: Subject to any disclaimer, the term of this patent is extended or adjusted under 35 U.S.C. 154(b) by 0 days.

This patent is subject to a terminal disclaimer.

(21) Appl. No.: 10/874,448

(22) Filed: Jun. 23, 2004

(65) Prior Publication Data

US 2004/0226179 A1 Nov. 18, 2004

Related U.S. Application Data

(63) Continuation of application No. 10/170,146, filed on Jun. 11, 2002, now Pat. No. 6,757,984.

(51) Int. Cl.[7] .............................. G01B 3/00; E04B 2/00
(52) U.S. Cl. .............................. 33/1 B; 33/494; 52/105
(58) Field of Search ........................ 33/494, 640, 1 B, 33/562, 563, 566; 52/105

(56) References Cited

U.S. PATENT DOCUMENTS

| 5,673,489 A | * | 10/1997 | Robell | .......................... 33/566 |
| 5,924,213 A | * | 7/1999 | Lee | .............................. 33/494 |
| 5,950,319 A | * | 9/1999 | Harris | .......................... 33/494 |
| 6,012,255 A | * | 1/2000 | Smid et al. | .................... 52/105 |
| 6,539,643 B1 | * | 4/2003 | Gleeson | ....................... 33/563 |
| 6,757,984 B2 | * | 7/2004 | Harris | .......................... 33/494 |

* cited by examiner

*Primary Examiner*—Christopher W. Fulton
(74) *Attorney, Agent, or Firm*—Henneman & Saunders; Larry E. Henneman, Jr.

(57) ABSTRACT

A novel guide is disclosed for fixing to a cutting tool for cutting a piece of sheet material having a plurality of fiducial lines marked thereon. The guide has a set of alignment marks and a plurality of measurement scales associated with the alignment marks. Each measurement scale corresponds to at least one of the fiducial lines, such that when one of the alignment marks is aligned with a particular fiducial line, the measurement scale corresponding to the particular fiducial line indicates the distance of the blade of the cutting tool from an edge of the sheet material. Particular embodiments of the guide include a flat portion attached to the front of the cutting tool, or alternately, a laser guide rotatably fixed to the front of the cutting tool. Novel methods for cutting a predetermined distance from an edge of a piece of sheet material using the guides of the present invention is also disclosed.

21 Claims, 14 Drawing Sheets

US 6,915,581 B2

SAW GUIDE FOR USE WITH LINED SHEET MATERIAL

RELATED APPLICATIONS

This application is a continuation of U.S. patent application Ser. No. 10/170,146, filed on Jun. 11, 2002 by the same inventor, which issued Jul. 6, 2004 as U.S. Pat. No. 6,757,984, and which is incorporated by reference herein in its entirety.

BACKGROUND OF THE INVENTION

1. Field of the Invention

This invention relates generally to guides for cutting tools, and more particularly to a saw guide for accurately and efficiently cutting a sheet material to a particular dimension.

2. Description of the Background Art

Sheet material is commonly used to cover large areas of a structure at construction sites. Typical sheet materials include plywood, particleboard, oriented strand board (OSB), wallboard, and varieties of laminates. Plywood and OSB are typically used to form the outside walls, the roof, and the floors of a structure. Similarly, wallboard (e.g., drywall, paneling, etc.) is secured to the interior frame of the structure to define and cover inside walls. Finally, laminates provide decorative coverings for flat surfaces (e.g., floors, counters, etc.). Installation of the sheet materials generally requires a construction worker to make at least one large cut to size the sheet material appropriately for the application.

Preparing the sheet material for proper installation is a time consuming process. Sheet material is typically prepared at a cutting station centrally located at the construction site, and is cut with a handheld circular saw via the following process. First, the worker measures a predetermined distance from an end edge of the sheet material using a tape measure, and marks a "crows foot" reference mark on the sheet material near one side edge of the material. The worker then repeats the measuring and marking procedure to provide a second reference mark near the opposite side edge of the material. Next, the worker stretched a chalk line across the two reference marks, and snaps the chalk line to mark a cut line on the material parallel to the end edge of the sheet at the predetermined distance. The worker then cuts the sheet material along the chalk line to yield a piece of material the desired size. The several steps required to cut each piece of sheet material are time consuming, and result in high labor cost, even for experienced workers, to properly cut the sheet material.

Many prior art devices have attempted to make it easier to cut sheet material more accurately and efficiently. For example, frame guides attach to the sheet of material and either attach to or abut the hand saw, to ensure that the cut is straight. Typically, frame guides are bulky and sometimes completely stationary, thereby requiring additional labor time to manipulate the cutting tool and/or sheet material into the proper position to make accurate cuts. Further, frame guides do not eliminate the need to mark the cut location on the sheet of material.

Another type of guide, commonly known as a rip fence, engages a reference edge of the material and attaches to the saw to maintain the saw at a set distance from the reference edge during the cut. Rip fences can be difficult to manipulate and use, because the guide must be as long as the cut distance. Further, the edge of a rip fence hangs over the reference edge of the sheet material, and at long cut distances it is difficult for the user to slide the rip fence along the edge of the material in unison with the motion of the saw.

Yet another problem with known cutting guides is that it is difficult to make fine corrections in the cutting path during a cut. For example, a slight deviation between the angle of the saw blade and the straight edge of the guide can result in the side of the blade binding against the sheet material, or pushing the rip guide away from the reference edge of the sheet material. In particular, if the blade of a saw is not aligned exactly with the cut path defined by the blade, the saw will want to follow a slightly different (either toward or away from the guide) cut path. Because the path of the saw is fixed by the guide, the operator will not be able to correct for this problem.

What is needed, therefore, is a guide for a cutting tool that facilitates quick and accurate positioning of a blade of the cutting tool at any desired distance from a reference edge of a piece of sheet material. What is also needed is a guide that need not be as long as the cut that is being made. What is also needed is a guide that facilitates user correction of a cut path during a cut.

SUMMARY

The present invention overcomes the problems associated with the prior art by providing a simple to use guide for use with a cutting tool, that eliminates the need to make more than one measurement and/or to snap a cut line on the sheet material. In the disclosed embodiments, no part of the guide extends below the top surface of the sheet material when the cutting tool is positioned on the sheet material, and does not, therefore, interfere with the manipulation of the cutting tool over the sheet material.

In one embodiment, the guide has a set of alignment marks and a plurality of measurement scales associated with the alignment marks. Each measurement scale corresponds to at least one fiducial lines such that when one of the alignment marks is aligned with a particular fiducial line, the measurement scale corresponding to the particular fiducial line indicates the distance of the blade of the cutting tool from an edge of the sheet material. In a particular embodiment, the guide includes identifying indicia that correlate the measurements scales to the fiducial lines. Examples of identifying indicia include, but are not limited to, distinctive line patterns, distinctive colors, and distinctive reference characters.

The length of the measurement scales differs amongst the various embodiments. In one embodiment, the measurement scales are at least as long as, but not significantly longer, than the distance between adjacent fiducial lines. In another embodiment, the measurement scales are at least as long as, but not significantly longer, than one-half the distance between adjacent fiducial lines.

In some of the embodiments, at least two measurement scales corresponds to each fiducial line, and are both provided on the same line of the guide. One measurement scale indicates the distance of the cutting blade from a reference edge of the sheet material when the reference edge of the sheet material is disposed on a first side (e.g., the left side) of the cutting tool. The second measurement scale indicates the distance of the blade from the reference edge when the reference edge is on the other side (e.g., the right side) of the cutting tool. The relative disposition of the scales is indicative of which of the two scales is valid, depending on the orientation of the reference edge with respect to the cutting tool.

In an alternate embodiment, the guide includes a projection device coupled to the cutting tool. In a more particular embodiment, the projection device is a rotatable laser, elevated and rotatably coupled to the front of the cutting tool by a base portion. The guide has an annular portion that includes the measurement scales, alignment marks, and their associated distances. The alignment marks are aligned with the fiducial lines by aligning an alignment mark with a reference mark, and then positioning the cutting tool such that the projected beam impinges on the fiducial line.

In another alternate embodiment, the guide includes a base portion coupled to the cutting tool, and an alignment member slidably coupled to the base portion. The alignment member does not extend below the upper surface of the sheet material, so as not to allow the cutting tool to rest flat on the surface of the sheet material. The alignment marks and the measurement scale(s) are disposed on one of the base portion and the alignment member. The other of the base portion and the alignment member includes a reference mark. The alignment marks are aligned with a fiducial line by aligning the alignment mark with the reference mark, and aligning a predetermined portion (e.g., the distal end) of the alignment member with the fiducial line. In other words, aligning a distal end of the guide with a fiducial line, and aligning an alignment mark on the guide with a reference mark on the cutting tool positions the blade of the cutting tool a predetermined distance from the fiducial line, and thus a predetermined distance from the edge of the sheet material. In an alternate embodiment, the alignment member is free of any measurement scales.

A method for cutting a piece of sheet material having a plurality of fiducial lines marked thereon is also described. One method includes the steps of selecting a scale including a predetermined distance from a plurality of scales, identifying one of a plurality of alignment marks identified by the selected scale as corresponding to the predetermined distance, aligning the identified alignment mark with one of the fiducial lines corresponding to the scale, and maintaining the alignment of the identified alignment mark and the fiducial line while cutting the sheet material.

In a particular method, the step of aligning the identified alignment mark with one of the fiducial lines includes moving an alignment member of said guide to align the identified alignment mark with a reference mark, and aligning a predetermined potion (e.g., the end, a mark, etc.) of the alignment member with the fiducial line. In another particular method, the step of aligning the alignment mark with the fiducial line includes rotating a projection device to align the alignment mark with a reference mark, and positioning the cutting tool such that a beam emitted by the projection device impinges on the fiducial line.

An alternate method of cutting a sheet of material having fiducial lines marked thereon includes the steps of determining a desired distance, measuring the desired distance on the sheet material, positioning the blade of the cutting tool at the desired distance, adjusting a guide fixed to the cutting tool into alignment with one of the fiducial lines, and maintaining alignment of said guide and said fiducial line while cutting said sheet material.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art by providing a relatively small guide for mounting on or incorporating in a cutting tool. The guide is simple to use, and can quickly, easily, and accurately position a cutting tool (e.g., a circular saw) on a piece of sheet material having fiducial lines marked thereon, to cut the sheet material at any desired length. In the following description, numerous specific details are set forth (e.g. incremental scales, the number and spacing of the fiducial lines, distinct line styles and indicia, etc.) in order to provide a thorough understanding of the invention. Those skilled in the art will recognize, however, that the invention may be practiced apart from these specific details. In other instances, details of well-known construction practices (e.g. material handling, sheet support during cutting, etc.) and tools (e.g., particular saw and saw blade types, etc.) have been omitted, so as not to unnecessarily obscure the present invention.

Figure 1:
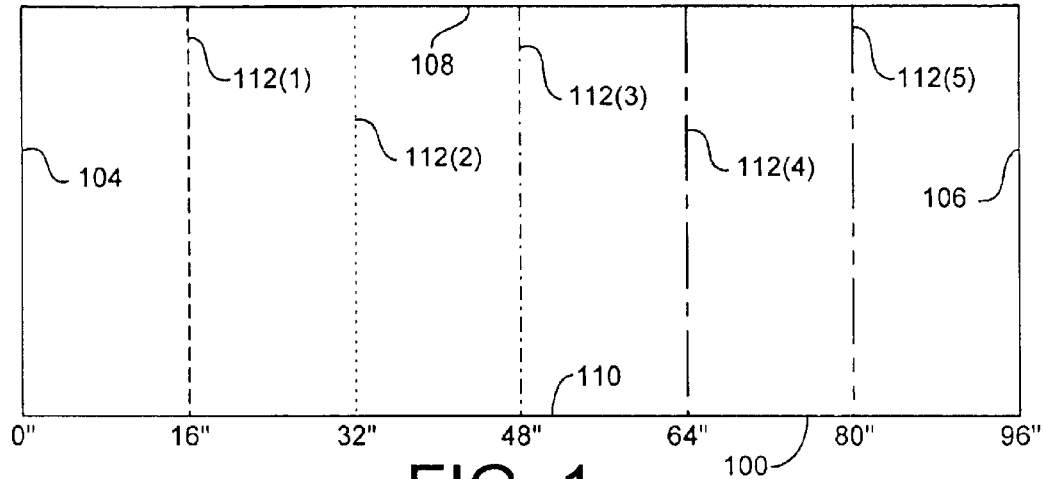
FIG. 1 is a top view of a piece of sheet material having distinctive fiducial lines marked thereon according to the present invention.

FIG. 1 shows a top plan view of a piece of sheet material 100 (e.g., plywood, drywall, OSB, etc.). Sheet material 100 includes a planar upper surface 102, a left edge 104, a right edge 106, a top edge 108, a bottom edge 110, and a plurality of fiducial lines 112(1–5). Sheet material 100 is generally rectangular having left edge 104 and right edge 106 parallel to each other, and similarly, top edge 108 and bottom edge 110 parallel also. Sheet material 100 can be any type of sheet material used in construction, including but not limited to the specific examples provided herein.

Fiducial lines 112(1–5) facilitate measurement and cutting of sheet material with a guide described below. Fiducial lines 112(1–5) are marked on surface 102 at predetermined distances from edge 104. In this particular embodiment, lines 112(1–5) are arranged at uniform 16 inch intervals, which corresponds to typical stud spacing of architectural structures. However, this particular spacing is not considered to be an essential element of the present invention. For example, a sheet can include a greater number of fiducial lines at shorter (e.g., 12 inch) intervals or a lesser number of fiducial lines at longer (e.g., 24 inch) intervals. Indeed, although evenly spaced lines are likely easier to use, it is not essential that the lines be evenly spaced, and it is conceivable that unevenly spaced lines might be desirable for some particular applications.

As will be described in greater detail below, the number and spacing of lines determines the minimum required length of the guide used to measure and cut the sheet material. Greater line spacing requires a longer guide, and smaller line spacing allows for the use of a shorter guide. While it is generally desirable to minimize the length of the guide, at some point closer spacing between the fiducial lines makes it difficult to discern the lines from one another.

Line spacings of 12, 16 and 24 inches are particularly desirable. These spacings evenly divide conventional 8, 12, and 16 foot sheet goods. Additionally, these intervals are easy to add in your head. For example, 12 inch lines can be easily counted: 12, 24, 36, 48, and so on. Lines spacings of less than 12 inches are less desirable, because adding the increments in your head becomes more time consuming and difficult. For example, by the time a worker could count to 86 inches by 6 inch intervals, he/she could have already measured and marked the material via conventional means.

Note also that each of fiducial lines 112(1–5) is distinguishable by a unique line-style, making them easily recognizable. In this particular embodiment, each of lines 112(1–5) has a unique style, but this is not necessarily required. For example, pairs of lines with the same line-styles can be arranged symmetrically about the center of the sheet material. As an alternative to unique line styles, fiducial lines 112(1–5) can be made distinguishable from one another by different colors, or by labeling with reference characters. In a particularly simple embodiment, the lines are identical, but are easily distinguished because they are spaced adequately (e.g., 16 inches, 24 inches, etc.) to facilitate recognition of the lines location at a glance.

Figure 2:
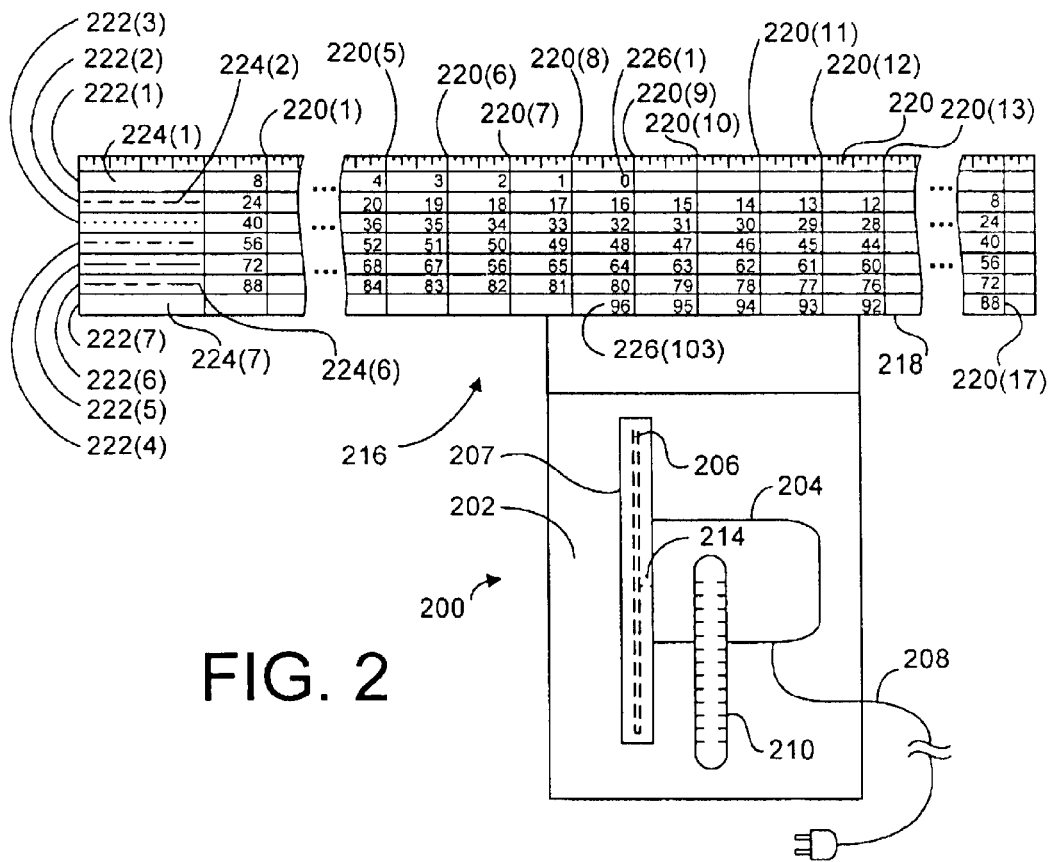
FIG. 2 is a top view of a cutting tool including a guide according to one embodiment of the present invention.

FIG. 2 shows a top plan view of a cutting tool 200 for cutting the sheet material 100 of FIG. 1. In this particular embodiment, cutting tool 200 is a circular saw that includes a platform 202, a motor 204, a blade 206, a blade guard 207, a power cord 208, and a handle 210. Blade 206 is fixed to motor 204 via a rotating shaft 214. In the present embodiment, cutting tool 200 represents an electrically powered circular saw (e.g. a Skill Saw™), which is readily available in the marketplace, although other types of cutting tools (e.g., saber saws, reciprocating saws, hand saws, drywall knives, etc.) can be used with the guide of the present invention. The operation of such cutting tools is well known in the art, and will not, therefore, be discussed in detail.

Saw 200 also includes a guide 216 fixed to the front of platform 202. Guide 216 cooperates with fiducial lines 112(1–5) to facilitate quick and accurate cutting, at any distance from edge 104, of sheet material 100. Guide 216 includes a flat portion 218, a set of alignment marks 220, a plurality of measurement scales 222(1–7) associated with alignment marks 220, a plurality of identifying indicia 224(1–7), and a plurality of distance numerals 226(1–103). Each distance numeral 226(1–103) is included in one of scales 222(1–7), and is associated one of alignment marks 220. Certain alignment marks 220(1–17) correspond to integer distance values, while the ones of alignment marks 220 between integer alignment marks 220(1–17) identify fractional spacing. Together, alignment marks 220 and distance numerals 226 function similar, but not identical, to a conventional ruler. However, the arrangement and identification of scales 220 on guide 216 are considered to be inventive aspects of the present invention.

Guide 216 can be fixed to cutting tool 200 by any convenient method (i.e. fasteners, welding, etc), so long as the means of attachment does not interfere with sliding platform 202 over sheet material 100. Note that no part of flat portion 218 extends below platform 202. Thus, platform 202 and guide 216 can rest flat on sheet material 100, thereby facilitating easy alignment of alignment marks 220 and fiducial lines 112(1–5).

Each of measurement scales 222(1–7) corresponds to an associated one of fiducial lines 112(1–5). In the present embodiment, the identifying indicia 224(1–7) indicate which of measurement scales 222(1–7) and which of fiducial lines 112(1–5) correspond to one another. Identifying indicia 224(1) and 224(7) (both blank) correspond with left edge 104 and right edge 106 of sheet material 100, respectively. Measurement scales 222(1–7) extend laterally across guide 216. Each distance numeral 226 represents the distance of blade 206 from left edge 104 of sheet 100, when the alignment mark associated with that distance numeral is aligned with the fiducial line corresponding to the measurement scale containing the distance numeral. There are 103 (with 6 repetitions) distance numerals 226(1–103), because this particular embodiment of the invention is intended to work with an 8 foot (96 inch) piece of sheet material.

A construction worker would use saw 200 with guide 216 as follows, to make at cut at any desired distance from left edge 104 of sheet material 100. First, the worker would position sheet material 100 on a support structure (e.g., saw horses). Next, the worker locates the desired distance on one of measurement scales 222. Then, the worker uses the identifying indicia associated with the scale containing the desired measurement, to identify one of fiducial lines 112 corresponding to that measurement scale 222. Next, an alignment mark 220 corresponding to the desired distance is aligned with the identified fiducial line 112. Finally, the worker cuts sheet 100 while maintaining alignment of alignment mark 220 and fiducial line 112. The cut sheet of material will be the desired length.

Figure 3:
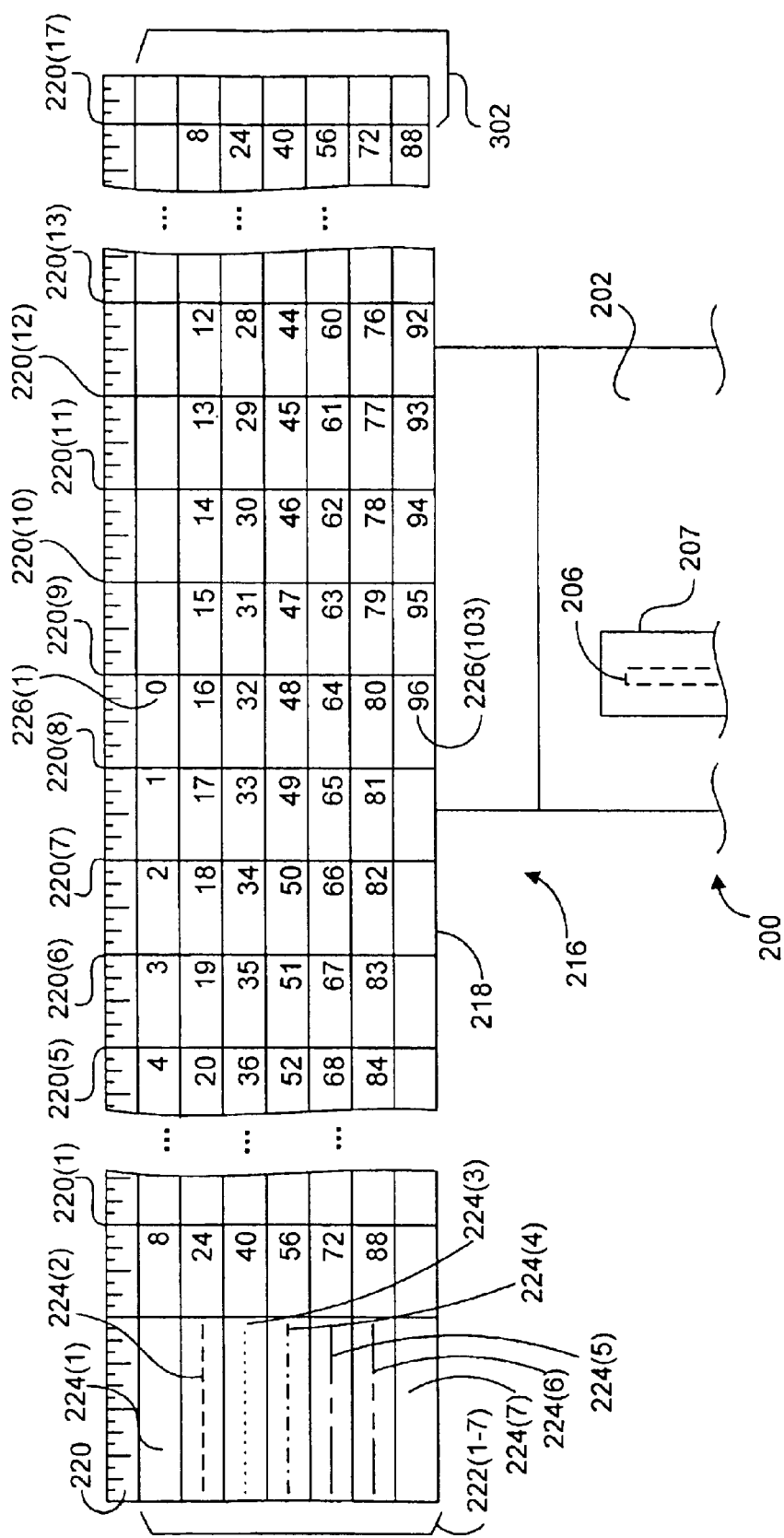
FIG. 3 is a close-up view of the guide of FIG. 2.

FIG. 3 shows a top plan view of guide 216 in greater detail. Two sections of guide 216 have been removed in order to fit the view within the extents of the page. The removed portions are substantially similar to the rest of guide 216, and the distance numerals provided thereon are arranged consecutively from right to left across each of scales 222(1–7), consistent with the distance numerals shown. For example, scale 222(2) includes the distances [9, 10, 11] in the right missing portion and the distances [21, 22, 23] in the left portion, each from right to left. Therefore, distances associated with scale 222(2) would begin at 8, associated with alignment mark 220(17), and end at 24 associated with alignment mark 220(1).

There are several features of the layout of distances 226(1–103) on guide 216 worth mentioning. First, note that measurement scales 222(1) and 222(7) have only half the number of distances 226 as the remaining scales 222(2–6). This is because alignment mark 220(9) associated with the "zero" distance numeral 226(1) is aligned with blade 206, and measurement scales 222(1) and 222(7) correspond to respective ends of sheet material 100. Therefore, blade 206 will not engage sheet material 100 if any alignment mark (i.e. mark 220(13)) to the right of alignment mark 220(9) is aligned with left edge 104 of sheet material 100, or if any alignment mark to the left of alignment mark 220(9) is aligned with right edge 106 of sheet material 100. In an alternate embodiment, scales 222(1) and 222(7) are positioned on the same line.

It should be noted that the alignment marks 220 to the left of integer alignment mark 220(1), and the alignment marks 220 to the right of integer alignment mark 220(17) are not necessary in order to be able to measure any distance on sheet 100. In this embodiment of the invention, the measurement scales 222 are at least as long, but not significantly longer, than the spacing between adjacent ones of fiducial lines 112. Measurement scales 222 could be made longer, but the unnecessary additional length of guide 216 might be considered a disadvantage.

There are several advantages to the embodiment of guide 216. First, guide 216 is very simple, to read and use. There is only one measurement scale 222 associated with each of fiducial lines 112, and each measurement scale 222 is printed on its own line. Second, the cutting process described above eliminates the need to measure (typically twice per cut) and snap a cut line on the material, thus saving time and labor costs.

Another advantage of guide 216 is that it can cut remnants of any size after a first cut from sheet material 100 has been made. The remaining ones of fiducial lines 112(1–5) quickly indicate the approximate size of the remnant because they are equally spaced, making use of remnants of sheet material 100 more likely. Because right edge 106 is typically intact after a first cut from sheet material 100 has been made, it can be used as a reference edge for making a second cut using guide 216. Of course, the association between the fiducial lines on the remnant and the measurement scales 222 must be inverted. For example, remnants can be cut using right edge 106 as the reference edge, by associating fiducial line 112(1) with scale 222(6), associating fiducial line 112(2) with scale 222(5), associating line 112(3) with scale 222(4), associating 112(4) with scale 222(3), associating line 112(5) with scale 222(2), and associating edge 10 with scale 222(1). Optionally, indicia of the inverted scale/line association can be printed on a right end portion 302 of guide 216.

Additionally, because scales 222 are at least as long as the spacing between adjacent fiducial lines 112, a cut can be made at any given distance from one side of sheet material 100. Thus, sheet material 100 need not be reoriented for cutting any particular distance. Sheets can simply be pulled off of a stack and cut.

The spacing and number of fiducial lines printed on sheet material determines the dimensions of guide 216. In general, the number of fiducial lines dictates the number of required measurement scales 222, and thus the height of the guide, while the spacing between the fiducial lines dictates the required length of the measurement scales, and thus the width of the guide. Therefore, increasing the distance between fiducial lines 112 will require a wider, shorter guide, while increasing the number of fiducial lines will create a taller, narrower guide. Thus, the dimensions of the guide can be formatted and manufactured according to particular applications and/or preferences.

Given the above general relationships between the number/spacing of the fiducial lines and the size of the guide, several options for making guide 216 slightly more compact are disclosed. One option is that scale 222(1) and scale 222(6) can be combined into a single scale, thus slightly reducing the height of guide 216. Another option is to select the number/spacing of fiducial lines 112(1–5) so that they are easily countable. Then, identifying indicia 224(1–7) could be removed from guide 216, further reducing its width. Additionally, an alternate embodiment described hereinafter (FIG. 5) discloses a guide with scales that need only be as long as half the distance between adjacent fiducial lines.

Figure 4:
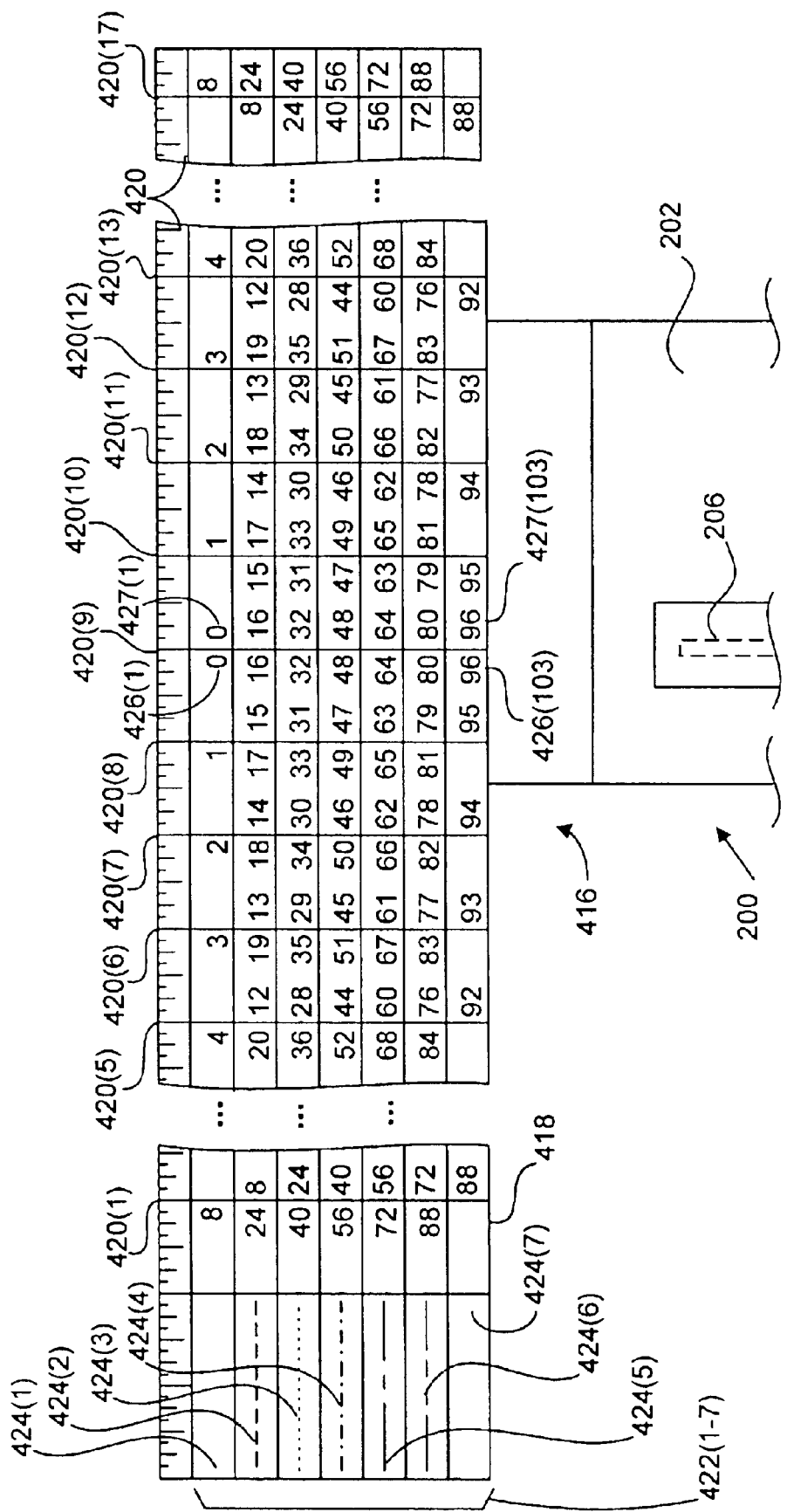
FIG. 4 is a top view of an alternate embodiment of a guide of the present invention.

FIG. 4 shows an alternate embodiment of a guide 416 for use with saw 200. Guide 416 is similar to guide 216 and has a flat portion 418, a set of alignment marks 420 (including integer marks 420(1–17) and fractional marks disposed therebetween), a plurality of measurement scales 422(1–7), a plurality of identifying indicia 424(1–7), a first plurality of distance numerals 426(1–103), and a second plurality of distance numerals 427(1–103). Each element introduced above is substantially similar to corresponding elements of guide 216, except second plurality of distances numerals 427(1–103).

Second plurality of distance numerals 427(1–103) adds flexibility to guide 416 by enabling a worker to make cuts at any desired distance from either side of sheet material 100. In particular, each of scales 422(2–6) includes two separate scales disposed on the same line. Each of scales 422(2–6) labels integer marks 420(1–17) with two distance numerals, one of numerals 426(1–103) to the left, and one of numerals 427(1–103) on the right. Distances 426(1–103) decrease consecutively from left to right, and distances 427(1–103) increase consecutively from left to right.

When making a cut, choosing the correct scale (i.e. either one of distances 426(1–103) or one of distances 427(1–103)) depends on the orientation of left edge 104 with respect to blade 206. For example, if left edge 104 is oriented to the left of blade 206, then distance numerals 426(1–103) provide the correct scale. On the other hand, if left edge 104 is oriented to the right of blade 206 (i.e. cutting from top edge 108), then distance numerals 427(1–103) provide the correct scale. As a reminder of the scale selection rules, distance numerals 426(1–103) are disposed on the left side of integer alignment marks 420(1–17), and distance numerals 427(1–103) are disposed on the right side of integer alignment marks 420(1–17).

Once the orientation of edge 104 is identified, and the proper measurement scale is selected, a worker cuts sheet 100 as described above. In particular, the worker aligns the appropriate alignment mark with the fiducial line 112 corresponding to the selected scale, and maintains the alignment during the cut.

Guide 416 offers some advantages and disadvantages as compared to other embodiments of the present invention. Like guide 216, guide 416 is fairly large in size (scales are as long as the spacing between fiducial lines 112), but facilitates a quick and accurate cut from either top edge 108 or from bottom edge 110. A slight disadvantage of guide 416 is that it is slightly more difficult to read the measurement scales than guide 216, due to the overlapping scales. It is anticipated, however, that a construction worker can quickly become accustomed to reading the scales of guide 416 in a short amount of time, making guide 416 a time saving and cost reducing tool.

Figure 5:
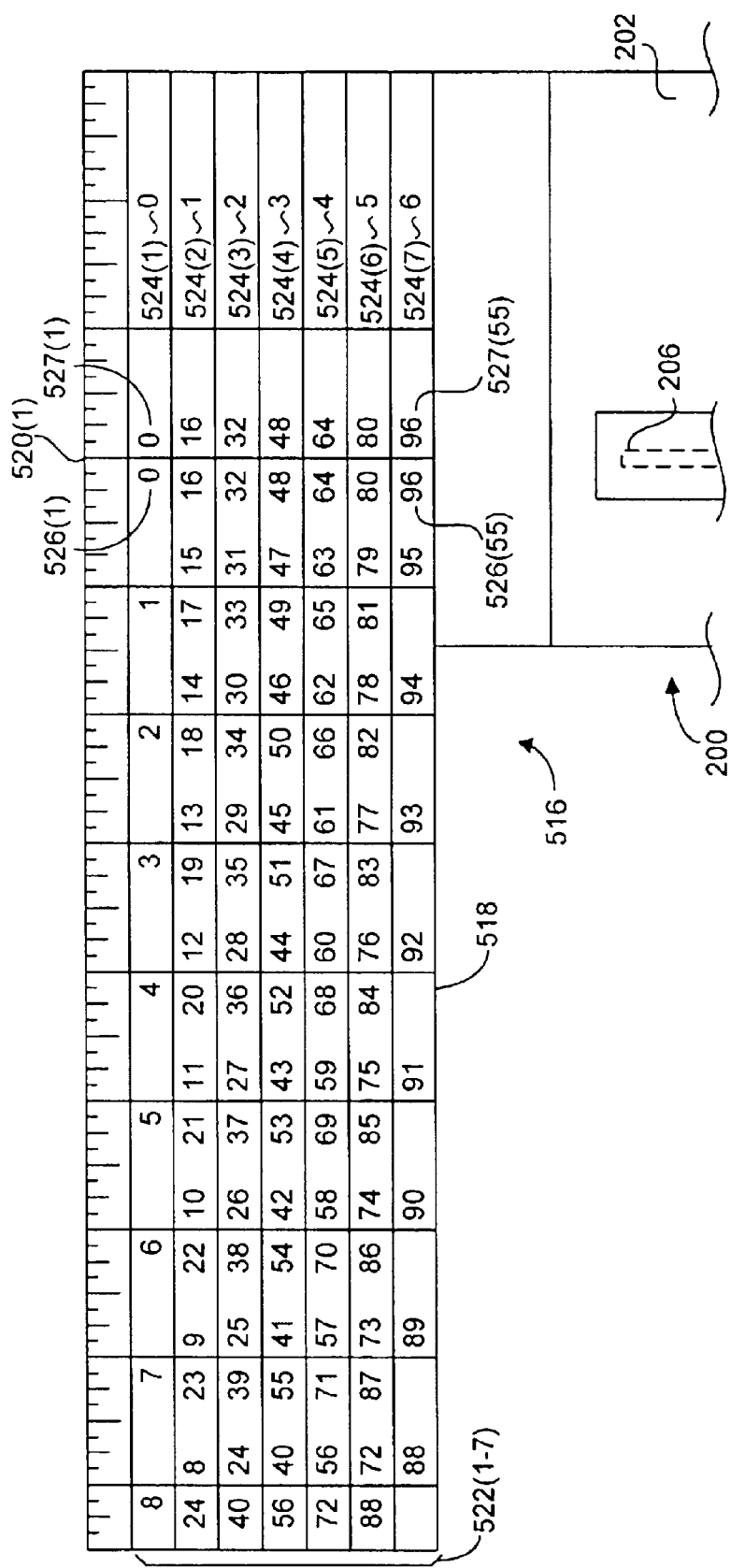
FIG. 5 is a top view of another alternate embodiment of a guide of the present invention.

FIG. 5 shows yet another alternate embodiment of a guide 516 for use with saw 200. Guide 516 includes a flat portion 518, a set of alignment marks 520 (including integer marks 520(1–9) and fractional marks disposed therebetween), a plurality of measurement scales 522(1–7) including a plurality of identifying indicia 524(1–7), a first plurality of distance numerals 526(1–54), and a second plurality of distance numerals 527(1–45).

There are several notable features of guide 516. First, guide 516 is approximately half the size of either guide 216 or guide 416. In particular, measurement scales 522 are at least as long, but not significantly longer, than one-half the distance between adjacent fiducial lines 112. Secondly, identifying indicia 524(1–7) are reference characters (numbers 0–6) instead of line patterns, as shown with previous embodiments. Each identifying indicia 524(1–7) represents the number of fiducial lines from a reference edge. Because fiducial lines 112(1–5) are counted when using this embodiment, they need not be drawn with distinct line styles. Optionally, reference characters (e.g., letters, numbers, etc.) can be printed on sheet material 100 to assist with counting fiducial lines 112. Finally, indicia 524(1–7) are located at the right edge of guide 516 in order to provide a larger area to fix guide 516 to platform 202, and to minimize the overall combined width of guide 516 and saw 200.

The primary advantage of guide 516 is that it is small in size compared to guides 216 and 416. To realize this small size, guide 516 requires that some cuts be made from top edge 108, and other cuts be made from bottom edge 110 of sheet material 100. Further, each of scales 522(2–6) label each integer alignment mark 520(1–9) with two distance numbers. All distance numbers 526(1–55) are oriented to the left of integer alignment marks 520(1–9), and distance numbers 527(1–55) are oriented to the right of alignment marks 520(1–9). As in the previously described embodiment, the disposition of a particular distance indicates the proper orientation of the reference edge 104 of sheet 100 with respect to blade 206. For example, if a 61 inch cut is desired, then the cut must be made with reference end 104 to the right of saw 200, because reference number "61" is disposed to the right of integer mark 520(4). Optionally, if fiducial lines 112 are arranged symmetrically on sheet 100 (as they are in the disclosed embodiments), then the lines can simply be counted from the opposite end of sheet 100. Thus, in the foregoing example a 61 inch cut can be made using the fourth fiducial line from right edge 106.

Figure 6:
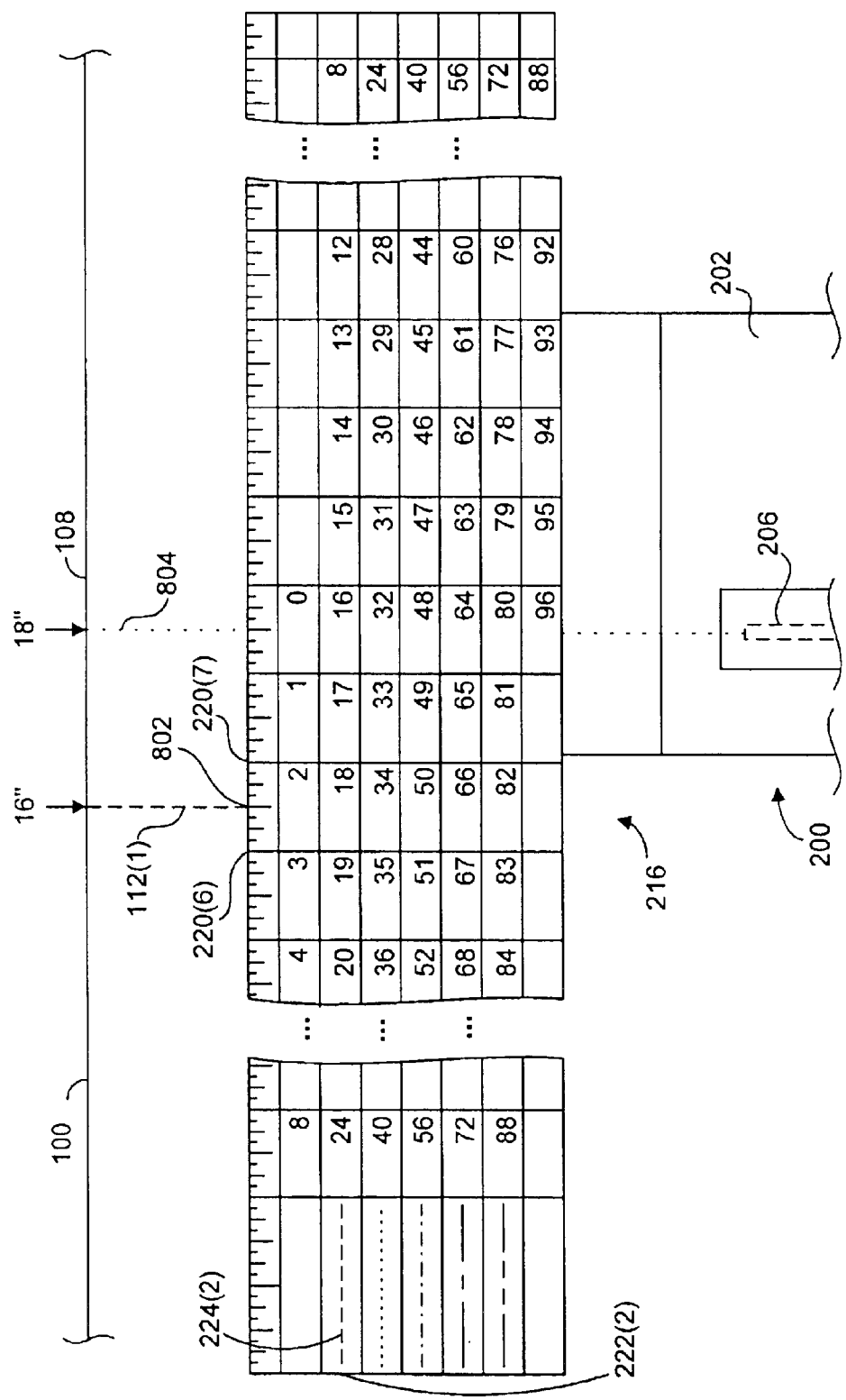
FIG. 6 is a top view of the cutting tool and guide of FIG. 2 cutting the sheet material of FIG. 1.

FIG. 6 shows a top plan view of saw 200, fitted with guide 216, making an 18½-inch cut with respect to left edge 104 (not shown) of sheet material 100. The worker locates an alignment mark 802 identified as corresponding to 18½ inches by measurement scale 222(2). Identifying indicia 224(2) (a long-dashed line) indicates that measurement scale 222(2) corresponds to fiducial line 112(1). As shown in FIG. 6, 18½ inch alignment mark 802 is aligned with fiducial line 112(1). Maintaining alignment of 18½ inch alignment mark 802 and fiducial line 112(1) positions blade 206 18½ inches from edge 104, and ensures a straight, accurate cut as saw 200 is guided from bottom edge 110 (not shown) to top edge 108. The path 804 that blade 206 follows while cutting sheet material 100 is shown as a dotted line.

Figure 7:
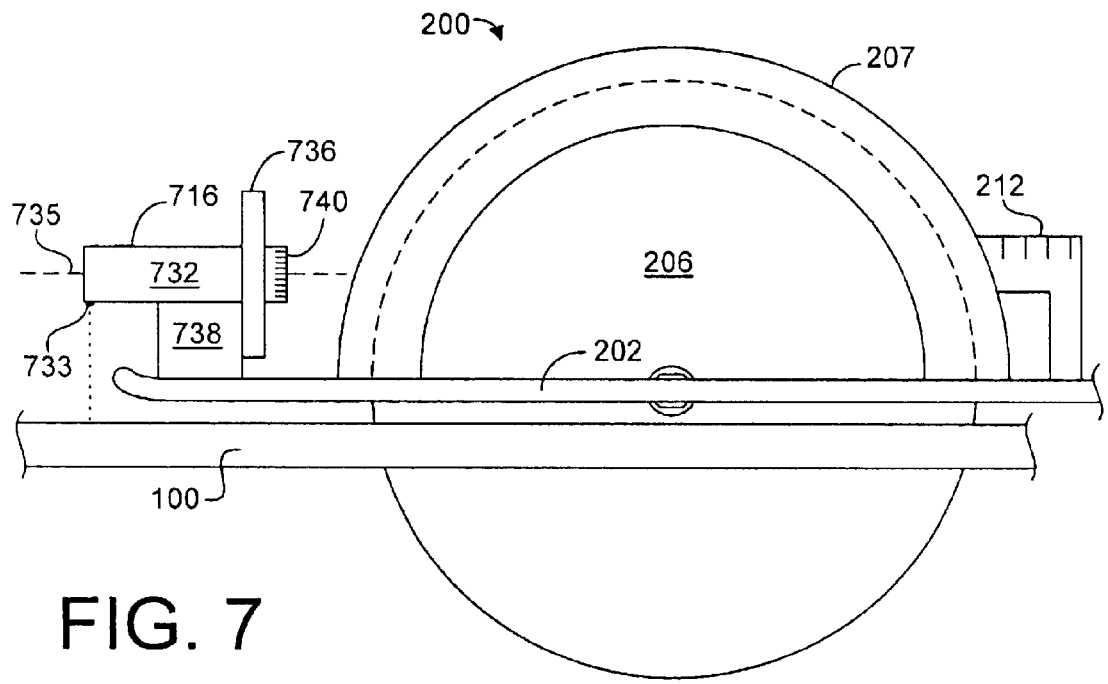
FIG. 7 is a side view of a cutting tool fitted with another guide of the present invention.

FIG. 7 shows a left side view of saw 200 fitted with an alternate guide 716 for measuring and cutting sheet material 100. Guide 716 includes a rotatable projection device 732 for projecting a beam 734, an annular portion 736, a base 738, and a knob 740. In the present embodiment projection device 732 is a laser, and projects laser beam 734 (indicated by the short dashed line) from a position 733 located at its forward edge. Laser 732 is rotatable about a central axis 735, to project laser beam 734 radially to points on sheet material 100. Annular portion 736 is coupled to and rotates with laser 732. Additionally, annular portion 736 has a plurality of scales marked thereon, such as those described in previous embodiments, which are viewable when looking at annular portion 736 from the rear of saw 200. Base 738 supports projection device 732 and annular portion 736 at a known distance above platform 202, sufficient to adequately project laser beam 734 onto sheet material 100. Knob 740 permits an operator of saw 200 to rotate laser 732 an annular portion 736 at will. In the present embodiment, knob 740 is a ribbed portion of the housing of laser 732 to provide grip for easy turning. Laser 732 is held in place by frictional forces strong enough to prevent unwanted movement during a cut, yet weak enough to allow a user to adjust its position. Optionally, a locking device (not shown) can be employed to lock laser 732 into position after adjustment.

Figure 8:
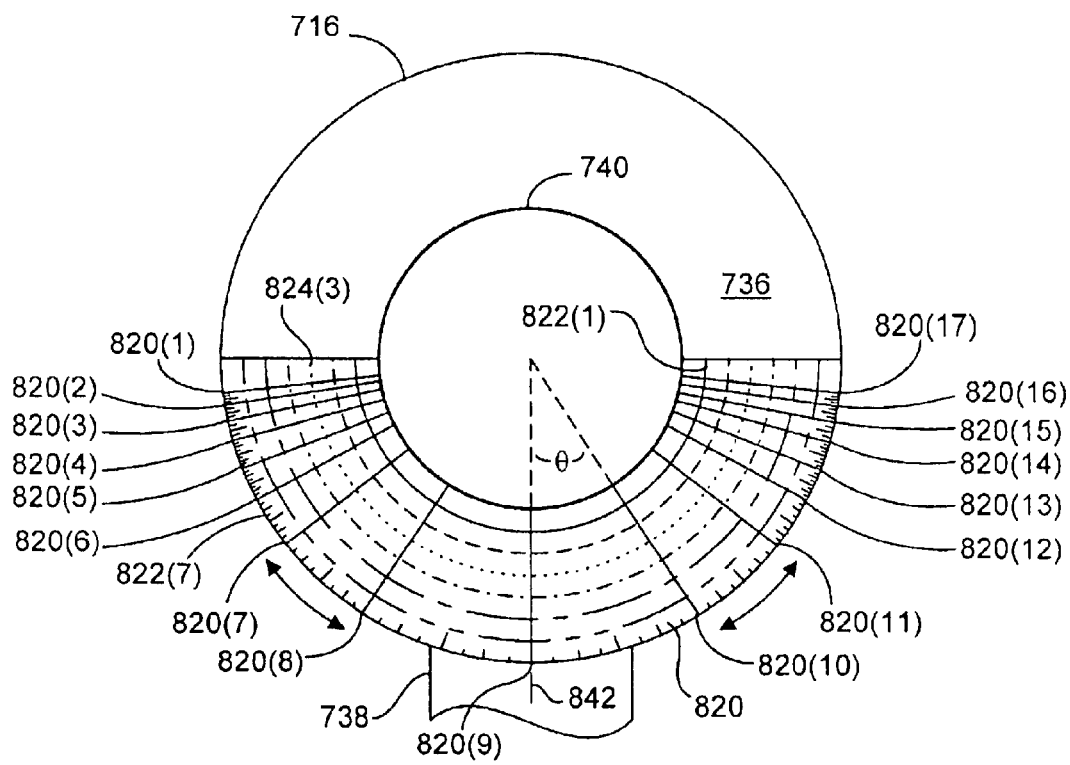
FIG. 8 is a rear view of the guide of FIG. 7.

FIG. 8 shows a rear plan view of guide 716 in greater detail. Annular portion 736 includes a set of alignment marks 820 (including integer marks 820 (1–17)), a plurality of measurement scales 822(1–7), and a plurality of identifying indicia 824(1–7). Additionally, base 738 includes a reference mark 842, in line with blade 206, for aligning with one of alignment marks 820. Alignment marks 820 are angularly spaced with respect to the center of laser 732. Measurement scales 822(1–7) correspond to left edge 104, fiducial lines 112(1–5), and right edge 106 of sheet material 100, respectively. Additionally, measurement scales 822 are each identified by associated identifying indicia 824(1–7) which correspond to the line styles of fiducial lines 112 (1–5). Solid lines identify left edge 104 and right edge 106, while the remaining identifying indicia 824(2–6) are particular line patterns. Additionally, distance numbers 826 (1–103) (shown in FIG. 9) are divided amongst measurement scales 822(1–7).

Initially, when alignment mark 820(9) is aligned with reference mark 842, laser beam 734 is projected straight down onto sheet material 100 in line with blade 206 of saw 200. Rotating laser 732, and thus annular portion 736, right or left will shift laser beam 734 in the same direction on sheet material 100. When one of alignment marks 820 is aligned with reference mark 842, and saw 200 is positioned such that the projected beam impinges on one of fiducial lines 112, the scale associated with that fiducial line indicates the distance of blade 206 from reference edge 104 of sheet 100.

The angular position of alignment marks 820 and measurement scales 822 is calculated as follows. Given the height (h) of axis 735, the angle (θ) required to provide a particular lateral displacement (x) of the projected beam 734 on sheet 100 can be determined by the following equation:

$$\theta = \tan^{-1}\left(\frac{x}{h}\right).$$

For example, if the height (h) of axis 735 from the bottom of platform 202 is 2.5 inches, the angle (θ) required to position laser beam 734 a distance of 1 inch from blade 206, is 21.8 degrees. Since each of alignment marks 820(1–17) are spaced in inches, alignment marks 820(8) and 820(10) would be positioned at −21.8 degrees and +21.8 degrees from alignment mark 820(9), respectively. The remaining alignment marks 820(1–17) are found similarly by incrementing x. The lateral displacement is then either added to or subtracted from the base distances of the fiducial lines (e.g., 16, 32, 48, . . . ), to obtain the distance numbers 826.

Figure 9:
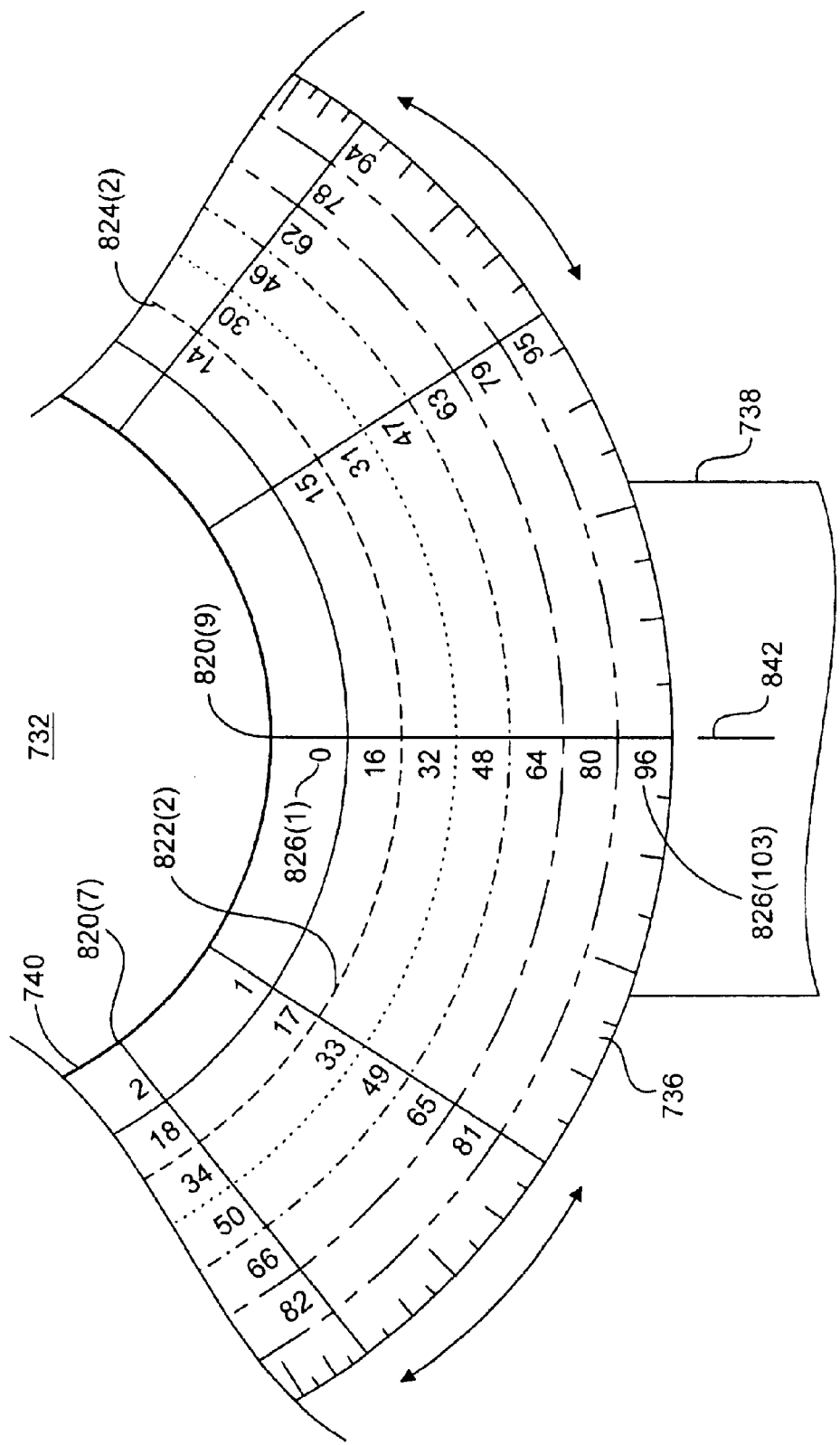
FIG. 9 is an enlarged rear view of a portion of the guide of FIG. 7.

FIG. 9 shows a portion of guide 716 in greater detail such that distance numbers 826(1–103) can be seen. Distance numbers 826(1–103) are arranged with respect to both measurement scales 822(1–7) and alignment marks 820 (1–17) similarly to the manner in which distance numbers 226(1–103) are arranged with respect to both measurement scales 222(1–7) and alignment marks 220(1–17) in the embodiment of FIG. 2. Alternatively, the scales of guide 716 can be arranged as shown in the embodiments previously described in FIG. 4 and FIG. 5.

Each of distances 826(1–103) is associated with one of measurement scales 822(1–7), and with one of identifying indicia 824(1–7) positioned directly below it. The innermost and outermost scales 822(1) and 822(7) on annular portion 736 are not directly associated with an identifying style because they correspond with left edge 104 and right edge 106, respectively, of sheet material 100.

Figure 10:
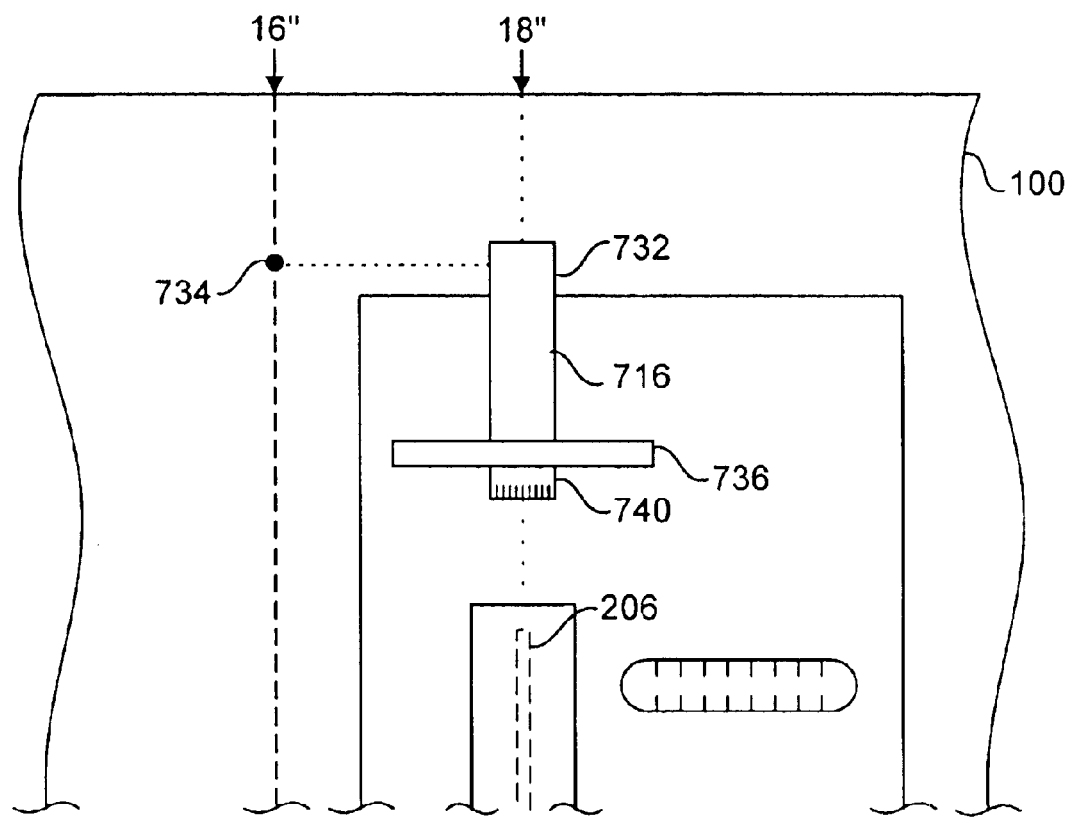
FIG. 10 is a top view of the cutting tool and guide of FIG. 7 cutting the sheet material of FIG. 1.

FIG. 10 shows a top view of saw 200 making a cut 18-inches from left edge 104 of sheet material 100 using guide 716. Referring to FIGS. 7–10, guide 716 is used as follows. Initially, the worker finds the 18-inch distance from distances 826(1–103). The 18-inch distance number is included in measurement scale 822(2), which is associated with fiducial line 112(1). To set laser beam 734 at the appropriate distance, laser 732 is rotated until alignment mark 820(7) is aligned with reference mark 842. Next, saw 200 is positioned such that laser beam 734 projects beam 734 on fiducial line 112(1), and left edge 104 is located to the left of blade 206. In other words, alignment mark 820(7) is aligned with fiducial line 112(1) by aligning mark 820(7) with reference mark 842, and positioning saw 200 so that beam 734 impinges on fiducial line 112(1). The cut is then made by tracing fiducial line 112(1) with laser beam 734, while moving saw 200 from bottom edge 110 to top edge 108 of sheet material 100.

Figure 11:
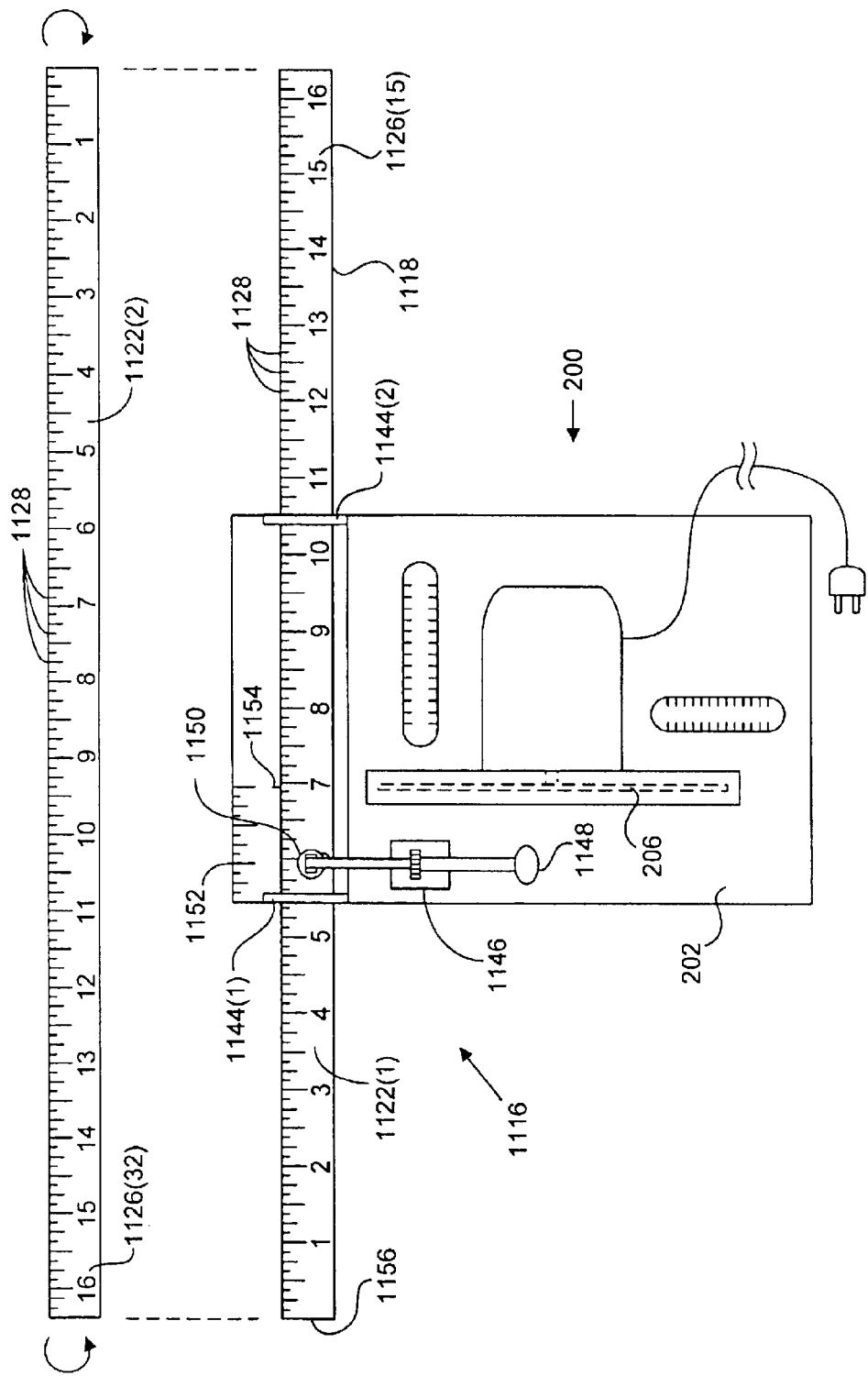
FIG. 11 is a top view of a cutting tool fitted with another guide of the present invention.
Figure 11A:
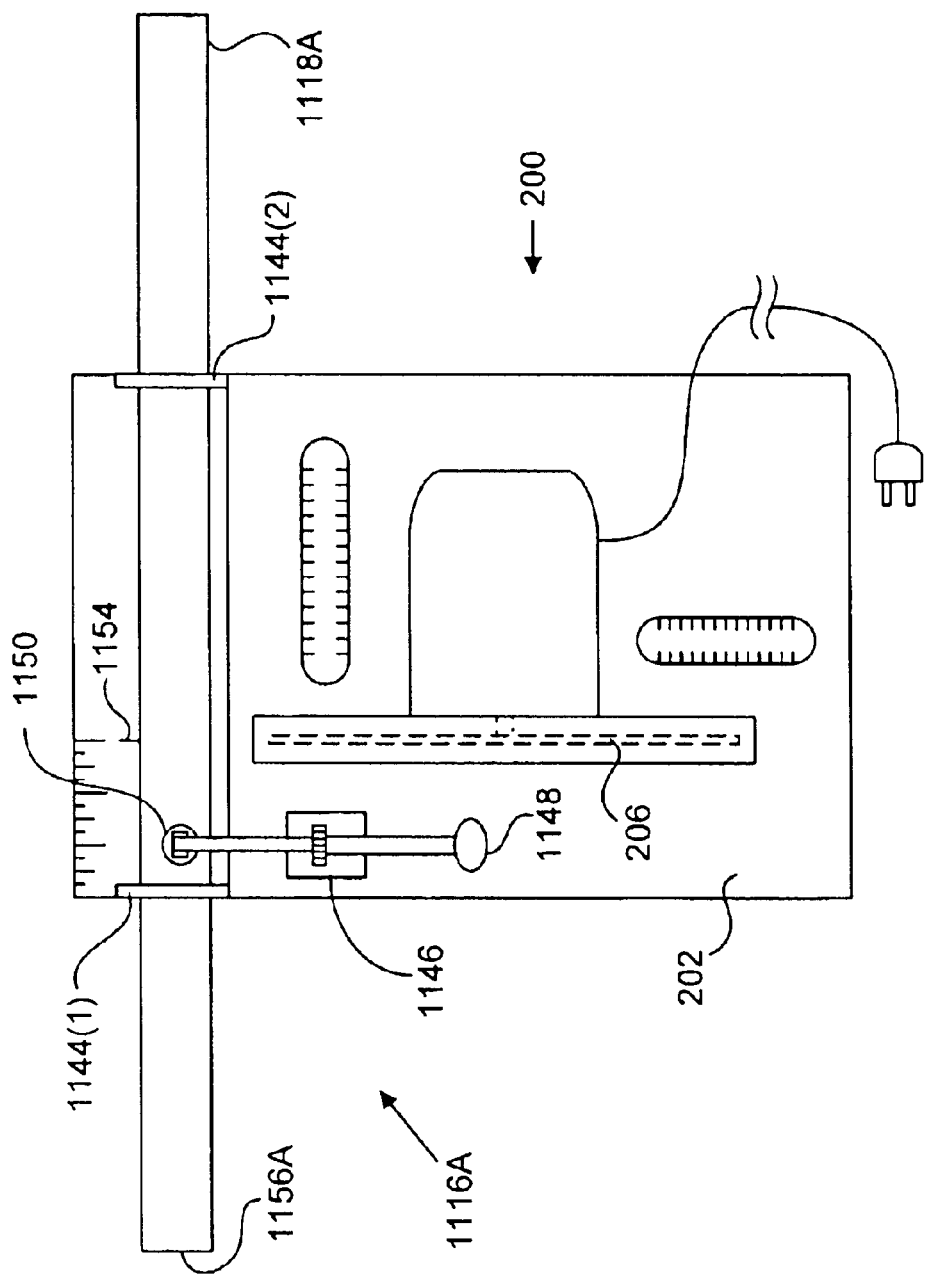

FIG. 11 shows a top view of saw 200 fitted with a guide 1116. Guide 1116 includes an alignment member 1118, a plurality of measurement scales 1122(1–2), a plurality of distance numbers 1126(1–32), and a set of alignment marks 1128. Guide 1116 further includes a pair of guide ways 1144(1–2), a lock 1146 having a rear lever 1148 and a pressure plate 1150, and blade alignment marks 1152.

Guide 1116 functions as follows. Measurement scales 1122(1–2), distance numbers 1126(1–32), and alignment marks 1128 are formed (i.e. printed, stamped, etc.) on alignment member 1118. Measurement scale 1122(1) and distances 1126(1–16) are formed on one side of alignment member 118, while measurement scale 1122(2) and distances 1126(17–32) are formed on the underside of alignment member 118. Distances 1126(1–32) indicate inches of scales 1122(1–2), and are formed similar to a standard ruler. Additionally, alignment marks 1128 subdivide each inch into common fractional amounts (i.e. eighths of an inch). Alignment member 1118 slides within guide ways 1144 (1–2), and does not extend below platform 202. In fact, in this particular embodiment, aligning structure 1116 is completely flat.

Lock 1146 clamps alignment member 1118 in place. Depressing rear lever 1148 of lock 1146 causes pressure plate 1150 to press alignment member 1118 against platform 202, thereby locking it in place. It should be understood that a great variety of known locking devices (e.g., thumb screws, detents, cam locks, etc.) may be substituted for lock 1146, so long as alignment member can be quickly released for alignment, and then be held securely in place during a cut.

Blade alignment marks 1152 are tick marks that are stamped or marked on platform 202, to indicate the position of blade 206 with respect to platform 202. Marks 1152 assist in making cuts close to fiducial lines 112, where platform 202 blocks the view of the fiducial line 112. In an alternate embodiment, alignment member 1118 and guideways 1144 (1–2) are positioned at the leading edge of platform 202, and alignment marks 1152 are unnecessary.

Saw 200 with guide 1116, is used to cut sheet material 100 as follows. First, a construction worker determines a desired distance that needs to be cut from sheet material 100, and locates the fiducial line 112(x) directly preceding the determined distance. When using this particular guide, fiducial lines need not be drawn with a distinctive color, pattern, or the like, but should be easily countable, and spaced at increments that are easy to add. Thus, the distance from left edge 104 to a particular fiducial line 112(x) can be quickly added (16, 32, 36, . . . ). Optionally, the distance to each fiducial line can be marked directly on the sheet material adjacent the fiducial lines. Next, the worker calculates the difference between the desired distance and the distance corresponding to fiducial line 112(x). Then, the worker slides alignment member 1118 to align an alignment mark 1128, indicated by measurement scale 1122(1) to correspond to the calculated difference, into alignment with a reference mark 1154. This alignment assures that a predetermined portion of alignment member 1118 (in this case its end 1156) is spaced apart from blade 206 by the calculated distance indicated by measurement scale 1122(1). Next, guide 1116 is locked in place by lock 1146, and the cut can be made by keeping the left distal end 1156 of guide 1116 aligned with fiducial line 112(x).

As a numerical example, assume the construction worker wishes to cut a 20-inch piece from sheet material 100. Because fiducial lines 112(1–5) are equally spaced to 16 inches, fiducial line 112(1) is the closest of fiducial lines 112(1–5) to the left of the 20-inch desired width. The difference between the desired 20-inch cut and the 16-inch fiducial line 112(1) is 4 inches. The worker then slides guide 1116 left through guide ways 1144(1–2), aligning the 4-inch one of alignment marks 1128 with reference mark 1154. After locking alignment member 116 in place, the worker can make the cut by tracing fiducial line 112(1) with the left distal end 1156 of alignment member 1118.

The foregoing cutting process can also be accomplished using right edge 106 of sheet material 100 as the reference edge, by removing guide 1116 from guide ways 1144(1–2), flipping it over to display measurement scale 1122(2) and replacing it in guide ways 1144(1–2). Distances 1126 (17–32) of scale 1122(2) are reversed in direction from distances 1126(1–16) of scale 1122(1) to simplify taking measurements from right edge 106 of sheet material 100.

Although scales 1122(1–2) are shown in this embodiment to be about as long as the spacing between adjacent fiducial lines, it should be understood that scales 1122(1–2) can be shorted to a length of about ½ the spacing between adjacent fiducial lines, as described above with respect to the embodiment of FIG. 5.

One alternate embodiment of guide 1116 facilitates cutting at a desired distance without having any scale whatsoever on alignment member 1118. Apart from alignment member 1118 being free of any measurement scales, the alternate guide is substantially similar to guide 1116.

Because the alternate alignment member is free of any measurement scale, one measurement must be made prior to cutting. Initially, the worker makes the one measurement of the desired distance (e.g., with a conventional tape measure), and marks the sheet. Next, the worker positions saw 200 to align blade 206 with the measured mark, and then adjusts the alternate alignment member to align the end of the alignment member with the nearest fiducial line. Then, the cut can be made, tracing the fiducial line with the end of the alternate alignment member. As compared to the prior art cutting method, the alternate guide saves one measurement and the step of snapping a chalk line on the sheet. Although this particular alternate embodiment requires the worker to make one measurement by conventional means, the inventor suspects that this embodiment may be the most generally accepted by workers in the field, at least in part due to its simplicity of use.

Some considered advantages and disadvantages of guide 1116 are as follows. One advantage of guide 1116 is that it is less bulky compared to the other embodiments described herein. Another advantage is that guide 1116 can be used with respect to either left side 104 or right side 106 of the sheet material 100, and cuts can be made from either top edge 108 or bottom edge 110. One possible disadvantage of guide 1116 is that mental calculations are required to determine the difference between the desired cut distance and the distance associated with the nearest fiducial line.

Figure 12:
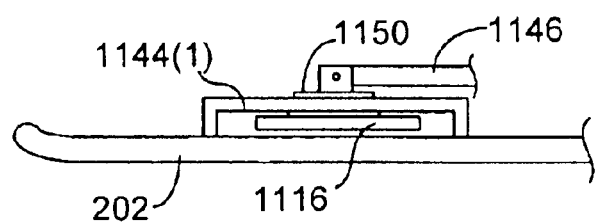
FIG. 12 is a left side view of the guide of FIG. 11 and the sheet material of FIG. 1.

FIG. 12 shows a left side view of alignment member 1116 passing through guide way 1144(1). Lock 1146 is retaining alignment member 1116 in a fixed position by applying pressure via press plate 1150. Note that guide 1116 does not extend below platform 202, and will not, therefore, interfere with or hinder the cutting of sheet material 100. Additionally, alignment member 1116 does not need a finished edge of sheet material 100 to align with, but rather only a line printed on sheet material 100. Guide 1116 can also align with an edge (e.g., left edge 104 or right edge 106) of sheet material if so required.

Figure 13A:
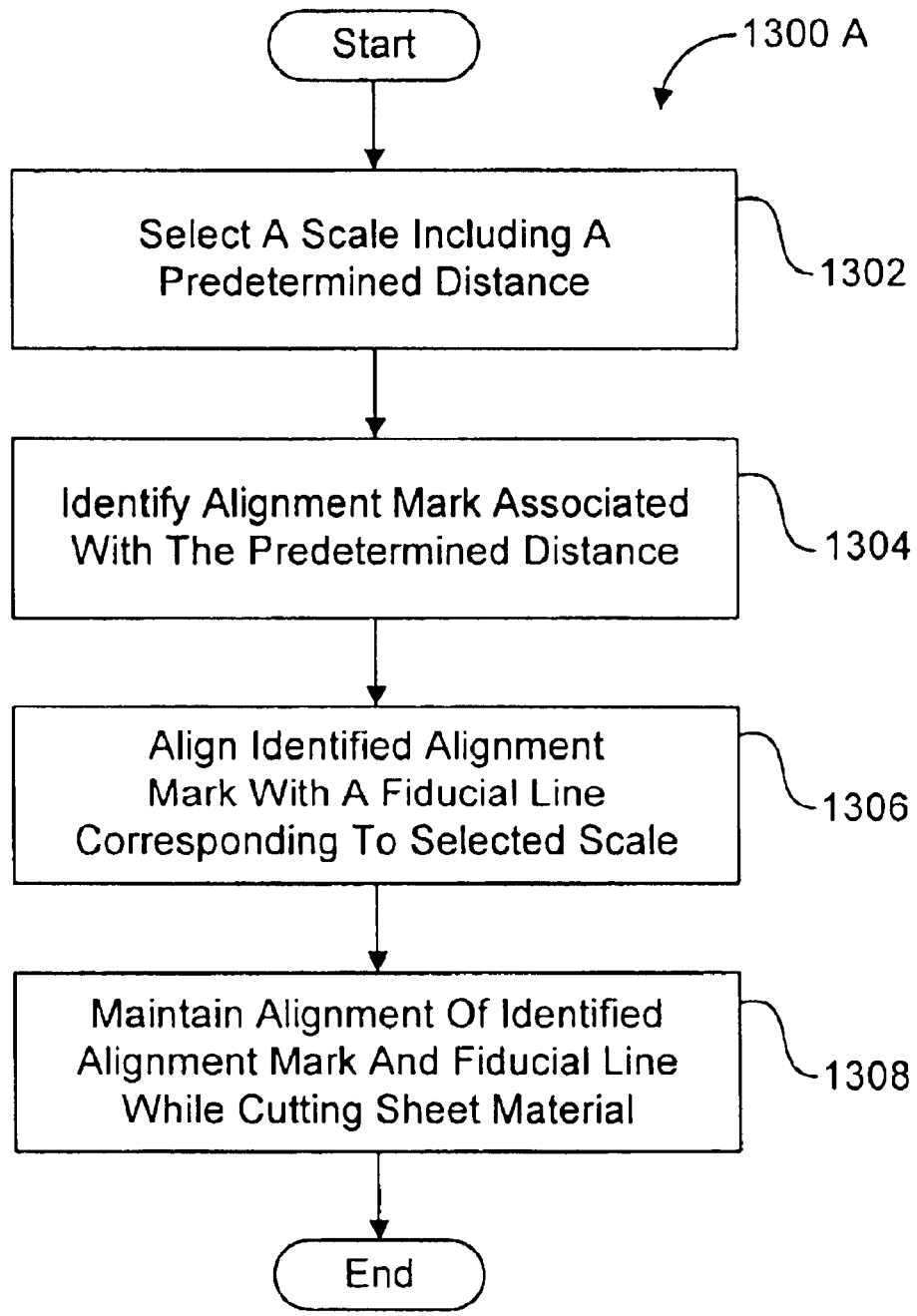
FIG. 13A is a flowchart summarizing one method of cutting the sheet material of FIG. 1.

FIG. 13A is a flowchart summarizing one method 1300A for cutting a sheet of material, having fiducial lines marked thereon, a predetermined distance from one of its edges, with a guide having a plurality of scales corresponding to the fiducial lines. In a first step 1302, a worker selects a measurement scale on the guide that includes the predetermined distance. Then, in a second step 1304, the worker identifies an alignment mark on the guide corresponding to the predetermined distance indicated by the selected scale. Next, in a third step 1306, the identified alignment mark is aligned with a fiducial line corresponding to the selected measurement scale. Then in a fourth step 1308, the sheet material is cut while maintaining the alignment of the identified alignment mark with the fiducial line.

Figure 13B:
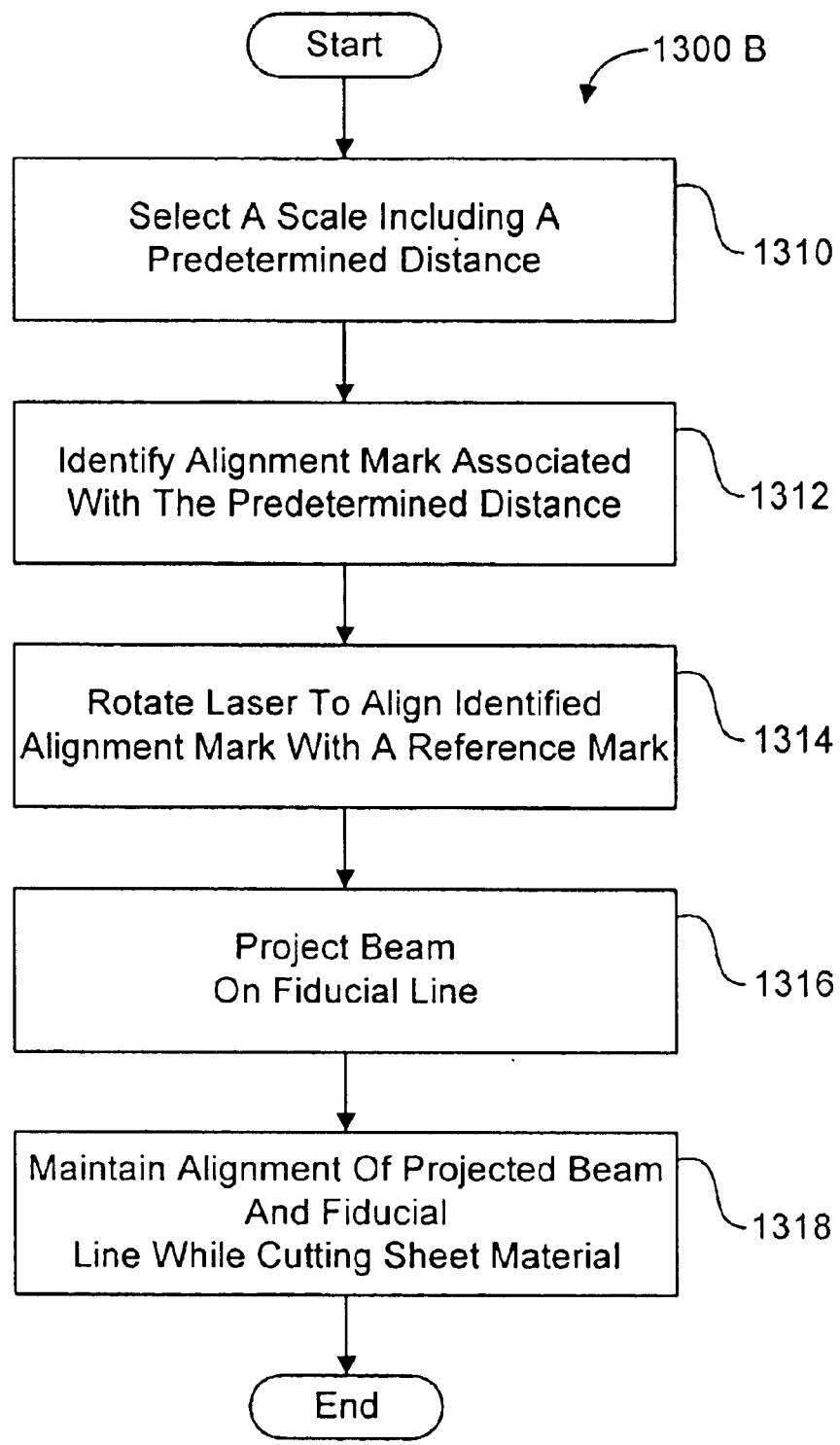
FIG. 13B is a flowchart summarizing another method of cutting the sheet material of FIG. 1.

FIG. 13B is a flowchart summarizing an alternate method 1300B for cutting sheet material, having fiducial lines marked thereon, a predetermined distance from one of its edges using a guide with a projection device (e.g., a laser). In a first step 1310, a construction worker selects a measurement scale including the predetermined distance. Then, in a second step 1312, the worker identifies an alignment mark corresponding to the predetermined distance. Next, in a third step 1314, the worker rotates the laser to align the identified alignment mark with a reference mark. Then, in a fourth step 1316, the guide and attached cutting device are positioned to project a beam onto a fiducial line 112 corresponding to the selected measurement scale. Finally, in a fifth step 1318, the alignment of the projected beam and the fiducial line 112 are maintained while cutting sheet material 100.

Figure 13C:
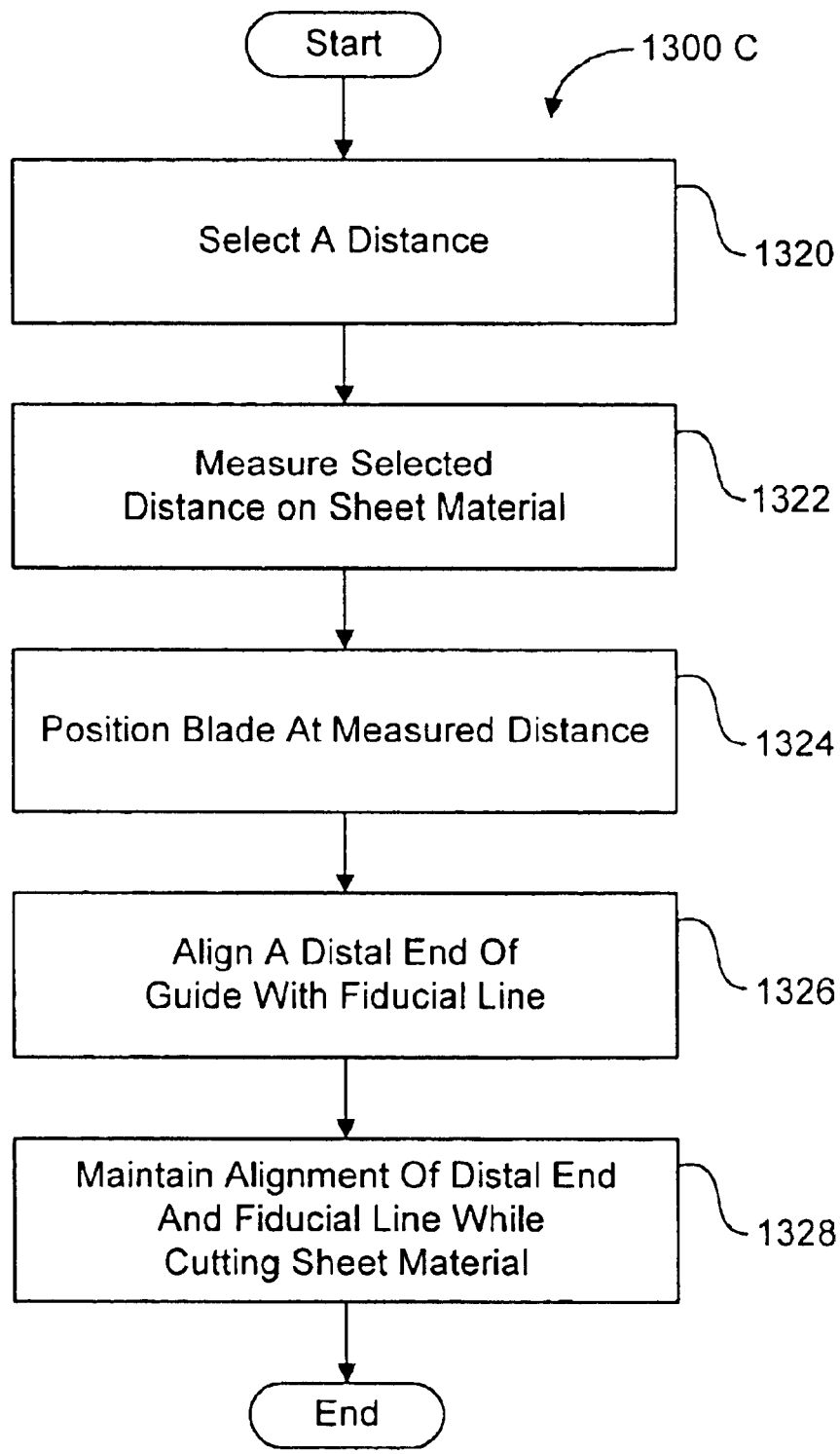
FIG. 13C is a flowchart summarizing still another method of cutting the sheet material of FIG. 1.

FIG. 13C shows a flowchart summarizing another alternate method 1300C for cutting a sheet of material, having fiducial lines marked thereon, a predetermined distance from one of its edges using guide substantially free of measurement scales. In a first step 1320 a worker selects a desired cut distance. Then, in a second step 1322, the worker measures the selected distance on the sheet material, and optionally scribes a mark. Next, in a third step 1324, the worker positions the blade of a cutting device fixed to the guide at the measured distance on the sheet material. Then, in a fourth step 1326, the worker aligns a predetermined portion (e.g., the left distal end) of the guide with a fiducial line, and locks the guide in place. Finally, in a fifth step 1328, the worker maintains the alignment of the guide and the fiducial line while cutting the sheet material.

Figure 13D:
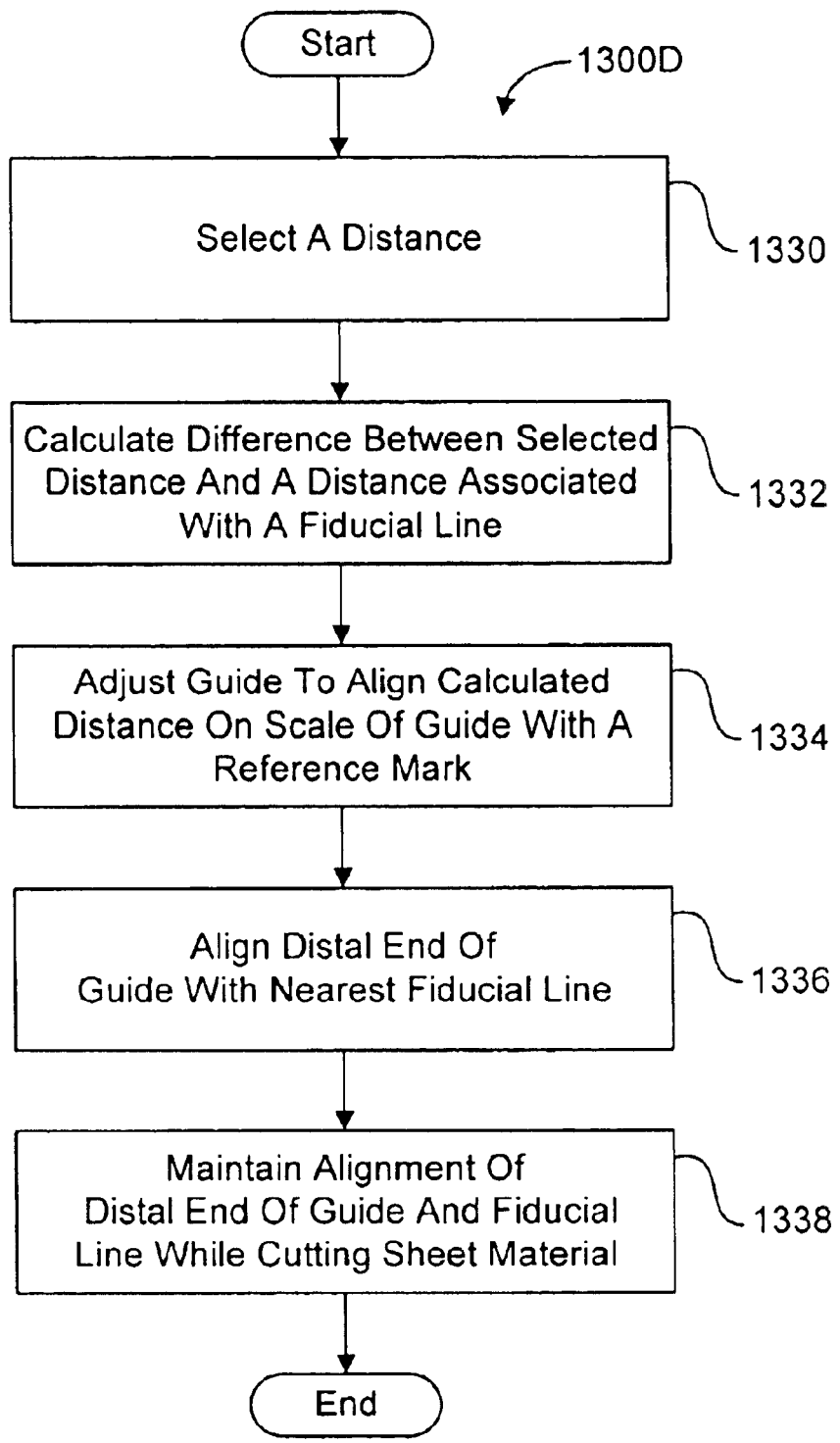
FIG. 13D is a flowchart summarizing yet another method of cutting the sheet material of FIG. 1.

FIG. 13D is a flowchart summarizing another method 1300D for cutting a sheet of material, having fiducial lines marked thereon, a predetermined distance from one of its edges using a guide having at least one measurement scale marked thereon. In a first step 1330, a worker selects a distance at which to make a cut in the sheet material. Then, in a second step 1332, the worker calculates the difference between the selected distance and a distance associated with one of the fiducial lines. Next, the guide is adjusted to align the calculated distance on a scale of the guide with a reference mark. Then, in a fourth step 1336 the worker positions the saw and the attached guide to align a predetermined portion (e.g., the distal end of an alignment member) of the guide with the fiducial line. Finally, in a fifth step 1338, the worker maintains alignment of the guide and the fiducial line while cutting the sheet of material.

The description of particular embodiments of the present invention is now complete. Many of the described features may be substituted, altered, or omitted without departing from the scope of the invention. For example, alternate identifying indicia (e.g. colors, numbers, etc.), may be substituted for the line patterns shown, to relate measurement scales to fiducial lines. As another example, the guides described herein can be used with other cutting tools such as jigsaws, routers, hand saws, etc. It should also be noted that the guides of the present invention can be made separately, and then be attached to a cutting tool, or can be made integrally with a cutting tool. Further, with respect to the embodiment employing a laser, a digital angular position sensor can be substituted for the mechanical alignment marks disclosed. The output from the sensor would be processed according to the formula disclosed with reference to FIG. 8, and the output displayed on a display device. As yet another example, while the embodiment of sheet material disclosed herein included a plurality of fiducial lines running across the narrow dimension of the material, it should be understood that the invention can be practiced with fiducial lines running across the long dimension of the sheet material. Indeed, combining fiducial lines running in both directions would be advantageous. These and other deviations from the particular embodiments shown will be apparent to those skilled in the art, particularly in view of the foregoing disclosure.

I claim:

1. A sheet of construction material comprising:
   a first planar surface;
   a second planar surface defining a thickness of said construction material between said first planar surface and said second planar surface;
   at least one reference edge;
   two lateral edges; and
   a plurality of fiducial lines marked on at least one of said first and second planar surfaces; and wherein
   said fiducial lines are parallel to said reference edge;
   the spacing between adjacent fiducial lines is at least twelve inches; and
   each of said fiducial lines includes a distinguishing characteristic with respect to at least some of the other fiducial lines, said distinguishing characteristic associating each of said fiducial lines with at least one of a plurality of reference scales on a saw guide.

2. A sheet of construction material according to claim 1, wherein said distinguishing characteristic is color.

3. A sheet of construction material according to claim 1, wherein said distinguishing characteristic is line pattern.

4. A sheet of construction material according to claim 1, wherein said distinguishing characteristic is a reference character.

5. A sheet of construction material according to claim 1, wherein the spacing between adjacent fiducial lines is sixteen inches.

6. A sheet of construction material according to claim 5, wherein:
- each of said lateral edges is at least eight feet in length; and
- said sheet material contains less than seven of said fiducial lines.

7. A sheet of construction material according to claim 5, wherein:
- each of said lateral edges is at least twelve feet in length; and
- said sheet material contains less than ten of said fiducial lines.

8. A sheet of construction material according to claim 5, wherein:
- each of said lateral edges is at least sixteen feet in length; and
- said sheet material contains less than thirteen of said fiducial lines.

9. A sheet of construction material according to claim 1, wherein said fiducial lines are evenly spaced.

10. A sheet of construction material according to claim 1, wherein said fiducial lines are symmetrically arranged about the center of said sheet material.

11. A sheet of construction material according to claim 10, wherein:
- pairs of said fiducial lines having a same distinguishing characteristic are symmetrically arranged about the center of said sheet material.

12. A sheet of construction material according to claim 1, wherein at least three of said fiducial lines have a unique distinguishing characteristic.

13. A sheet of construction material according to claim 1, wherein:
- one of said fiducial lines has two adjacent fiducial lines; and
- said two adjacent fiducial lines each have a different distinguishing characteristic than said one of said fiducial lines and than each other.

14. A sheet of construction material according to claim 1, wherein each of said fiducial lines includes a unique distinguishing characteristic with respect to every other said fiducial line.

15. A sheet of construction material comprising:

a first planar surface;

a second planar surface defining a thickness of said construction material between said first planar surface and said second planar surface;

at least one reference edge;

two lateral edges; and a plurality of fiducial lines marked on at least one of said first and second planar surfaces parallel to said reference edge; and means for associating each of said fiducial lines with one of a plurality of reference scales on a saw guide.

16. A sheet of construction material according to claim 15, wherein said means for associating each of said fiducial lines with said one of said plurality of reference scales is color.

17. A sheet of construction material according to claim 15, wherein said means for associating each of said fiducial lines with said one of said plurality of reference scales is line pattern.

18. A sheet of construction material according to claim 15, wherein said means for associating each of said fiducial lines with said one of said plurality of reference scales is a reference character.

19. A sheet of construction material according to claim 15, wherein said fiducial lines are symmetrically arranged about the center of said sheet material.

20. A sheet of construction material according to claim 19, wherein:
- pairs of said fiducial lines are symmetrically arranged about the center of said sheet material; and
- said pairs of said fiducial lines include a same means for associating each of said fiducial lines with said one of said plurality of reference scales.

21. A sheet of construction material according to claim 15, wherein:
- the spacing between adjacent fiducial lines is sixteen inches;
- each of said lateral edges is at least eight feet in length; and
- said sheet material contains less than seven of said fiducial lines.

* * * * *